(12) United States Patent
Buesser et al.

(10) Patent No.: US 10,762,111 B2
(45) Date of Patent: *Sep. 1, 2020

(54) AUTOMATIC FEATURE LEARNING FROM A RELATIONAL DATABASE FOR PREDICTIVE MODELLING

(71) Applicant: INTERNATIONAL BUSINESS MACHINES CORPORATION, Armonk, NY (US)

(72) Inventors: Beat Buesser, Ashtown (IE); Thanh Lam Hoang, Maynooth (IE); Mathieu Sinn, Dublin (IE); Ngoc Minh Tran, Dublin (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 425 days.

This patent is subject to a terminal disclaimer.

(21) Appl. No.: 15/714,140

(22) Filed: Sep. 25, 2017

(65) Prior Publication Data
US 2019/0095515 A1 Mar. 28, 2019

(51) Int. Cl.
| G06F 17/00 | (2019.01) |
| G06F 16/28 | (2019.01) |
| G06N 3/08 | (2006.01) |
| G06F 16/2455 | (2019.01) |
| G06N 5/02 | (2006.01) |

(Continued)

(52) U.S. Cl.
CPC ........ *G06F 16/288* (2019.01); *G06F 16/2456* (2019.01); *G06N 3/0427* (2013.01); *G06N 3/0445* (2013.01); *G06N 3/0454* (2013.01); *G06N 3/08* (2013.01); *G06N 3/082* (2013.01); *G06N 5/022* (2013.01); *G06N 3/049* (2013.01); *G06N 5/003* (2013.01); *G06N 7/005* (2013.01); *G06N 20/00* (2019.01)

(58) Field of Classification Search
None
See application file for complete search history.

(56) References Cited

U.S. PATENT DOCUMENTS

| 7,266,537 B2 | 9/2007 | Jacobsen et al. |
| 7,693,767 B2 | 4/2010 | Petriuc |

(Continued)

FOREIGN PATENT DOCUMENTS

EP    2648115 A1    10/2013

OTHER PUBLICATIONS

Hoang et al., "One button machine for automating feature engineering in relational databases," arXiv:1706.00327v1 [cs.DB], Jun. 1, 2017 (9 pages).

(Continued)

*Primary Examiner* — Anhtai V Tran
(74) *Attorney, Agent, or Firm* — Griffiths & Seaton PLLC

(57) ABSTRACT

Embodiments for automatic feature learning for predictive modelling in a computing environment by a processor. A first table and a second table are joined based on an edge between the first table and the second table defined by an entity graph thereby creating a resulting joined table that is connected by a column of data. The resulting joined table is used as an input into one or more neural network operations that transform the resulting joined table to one or more features to predict a target variable.

14 Claims, 9 Drawing Sheets

(51) Int. Cl.
  *G06N 3/04* (2006.01)
  *G06N 20/00* (2019.01)
  *G06N 7/00* (2006.01)
  *G06N 5/00* (2006.01)

(56) References Cited

U.S. PATENT DOCUMENTS

| | | |
|---|---|---|
| 7,912,795 B2 | 3/2011 | Chaudhury et al. |
| 8,572,071 B2 | 10/2013 | Pottenger et al. |
| 9,437,024 B2 | 9/2016 | Krajec et al. |
| 9,483,734 B2 | 11/2016 | Laxmanan et al. |
| 9,613,316 B2 | 4/2017 | Harik |
| 2012/0004893 A1 | 1/2012 | Vaidyanathan et al. |
| 2012/0284215 A1 | 11/2012 | Shibata |
| 2014/0200873 A1* | 7/2014 | Fang .................. B61L 27/0055 703/8 |
| 2015/0310073 A1* | 10/2015 | Chakrabarti ........ G06F 16/2465 707/722 |
| 2016/0078346 A1 | 3/2016 | Pallath |
| 2017/0091673 A1 | 3/2017 | Gupta et al. |
| 2019/0073580 A1* | 3/2019 | Dzhulgakov ...... G06Q 30/0241 |

OTHER PUBLICATIONS

Cheng et al., "Semisupervised Domain Adaptation on Manifolds," IEEE Transactions on Neural Networks and Learning Systems, 2014 (10 pages).

Perovsek et al., "Wordification: Propositionalization by unfolding relational data into bags of words," Expert Systems with Applications 42, www.elsevier.com/locate/eswa, Apr. 24, 2015 (15 pages).

\* cited by examiner ural network operations that transform the resulting joined table to one or more features to predict a target variable. -->

AUTOMATIC FEATURE LEARNING FROM A RELATIONAL DATABASE FOR PREDICTIVE MODELLING

BACKGROUND OF THE INVENTION

Field of the Invention

The present invention relates in general to computing systems, and more particularly to, various embodiments for automatic feature learning for predictive modelling in a computing environment using one or more computing processors.

Description of the Related Art

In today's interconnected and complex society, computers and computer-driven equipment are more commonplace. Processing devices, with the advent and further miniaturization of integrated circuits, have made it possible to be integrated into a wide variety of personal, business, health, home, education, entertainment, travel and other devices. Accordingly, the use of computers, network appliances, and similar data processing devices continue to proliferate throughout society.

SUMMARY OF THE INVENTION

Various embodiments for automatic feature learning for predictive modelling in a computing environment by a processor, are provided. In one embodiment, by way of example only, a method for automatic feature learning for predictive modelling in a computing environment, again by a processor, is provided. A first table and a second table are joined based on an edge between the first table and the second table defined by an entity graph, wherein a resulting joined table is connected by a column of data. The resulting joined table is used as an input into one or more neural network operations that transform the resulting joined table to one or more features to predict a target variable.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
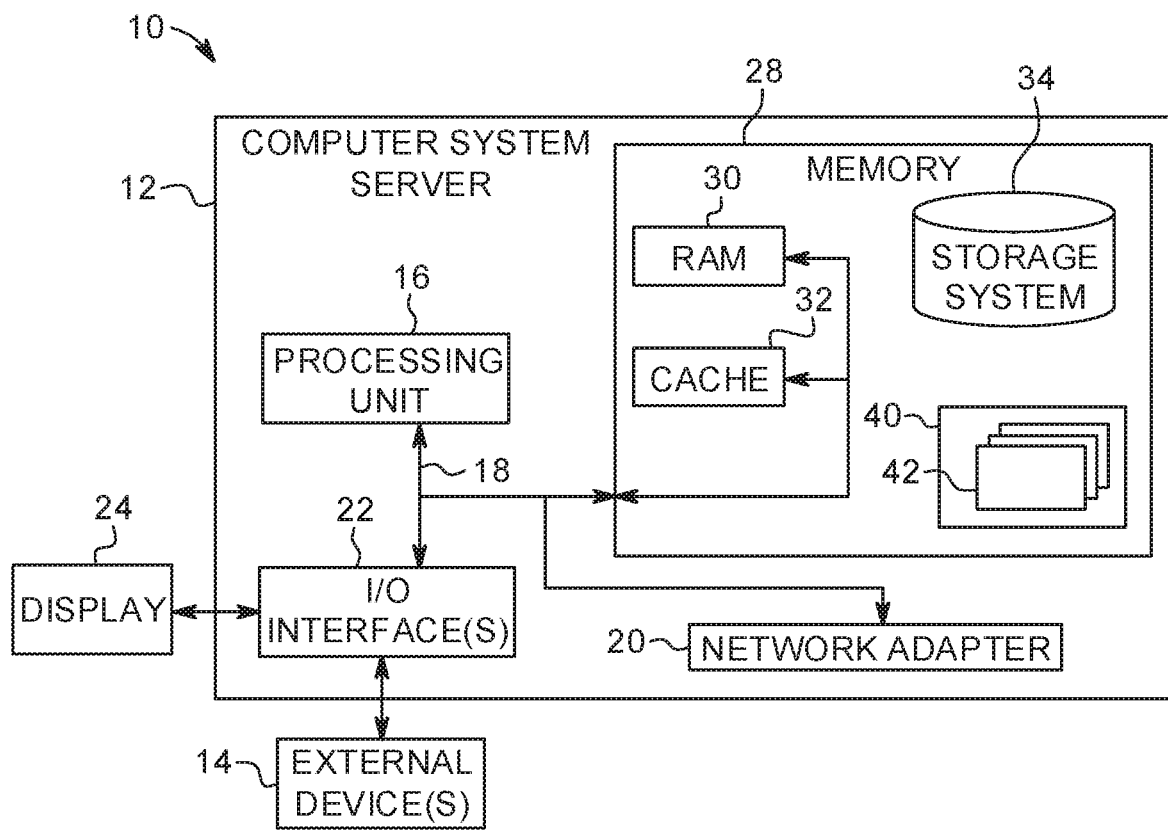
FIG. 1 is a block diagram depicting an exemplary cloud computing node according to an embodiment of the present invention.

Various embodiments are provided herein for automatic feature learning for predictive modelling in a computing environment by a processor. In one embodiment, by way of example only, a method for automatic feature learning for predictive modelling in a computing environment, again by a processor, is provided. A first table and a second table are joined based on an edge between the first table and the second table defined by an entity graph thereby creating a resulting joined table that is connected by a column of data. The resulting joined table is used as an input into one or more neural network operations that transforms the resulting joined table to one or more features to predict a target variable.

In one aspect, the entity graph may be a graph where one or more nodes represent tables. Edges may be relational links between the tables. A relational tree may be a tree representation of the joining results (e.g., resulting joined table) following path "p" for any user in a main table. Every path from a root to a leaf node of the relational tree may correspond to a row in the joining results (e.g., resulting joined table) following the path "p" for a corresponding user. A relational tree may be defined for every user "u" per joining path "p", denoted as t(p,u).

In an additional aspect, transformation functions may be learned to create features for predictive modelling applications from a relational database. The database may include at least one main table with training examples and a target variable, and multiple tables that link to the main table and each other via foreign keys. The data in all the tables may include unstructured data: spatio-temporal data, time-series, sequences, item sets, number sets, singleton, texts and images, and simple data such as numerical and categorical. The main table may be joined with other tables to produce joint results for each entity in the main table. The resulting joined table may represent the joint results in the form of relational trees. One or more transformation functions may be used in a supervised learning process to transform relational trees into feature vectors. A set of features may be produced (e.g., output) and can be used as input into a feature selection component or directly to predictive models.

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 12.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
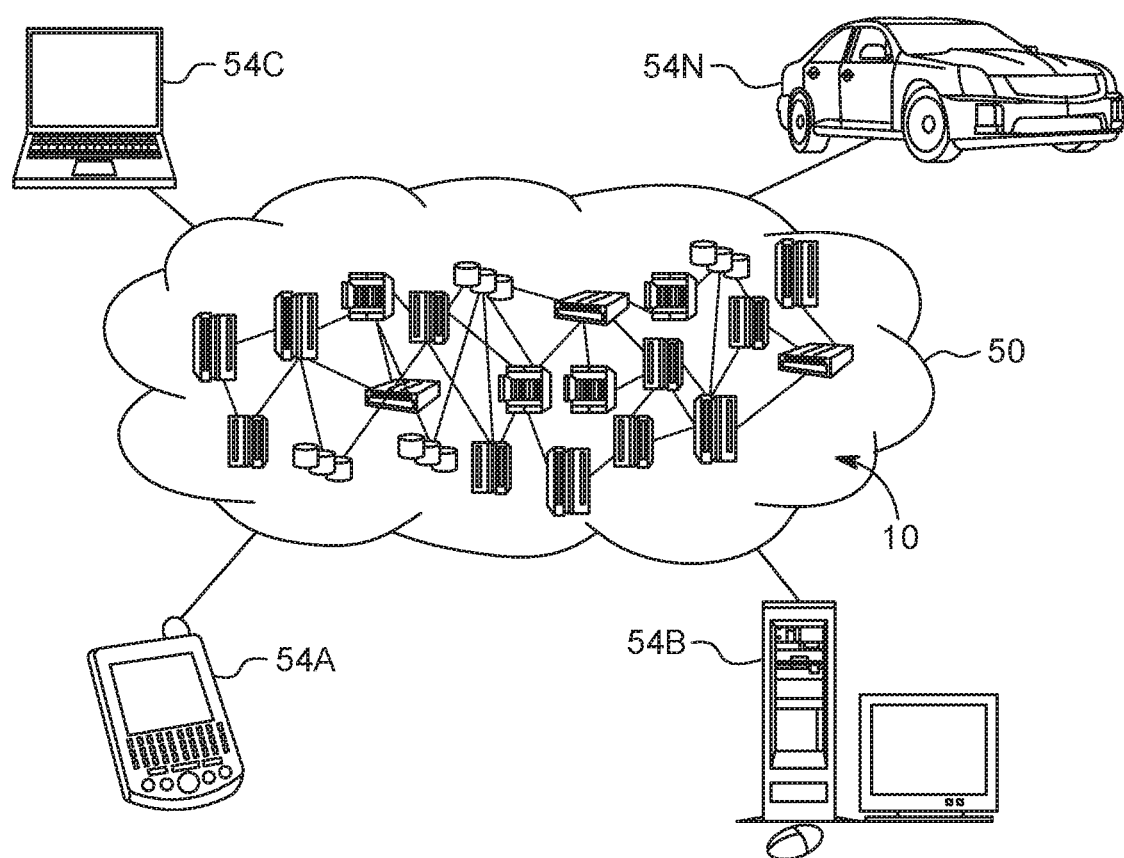
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
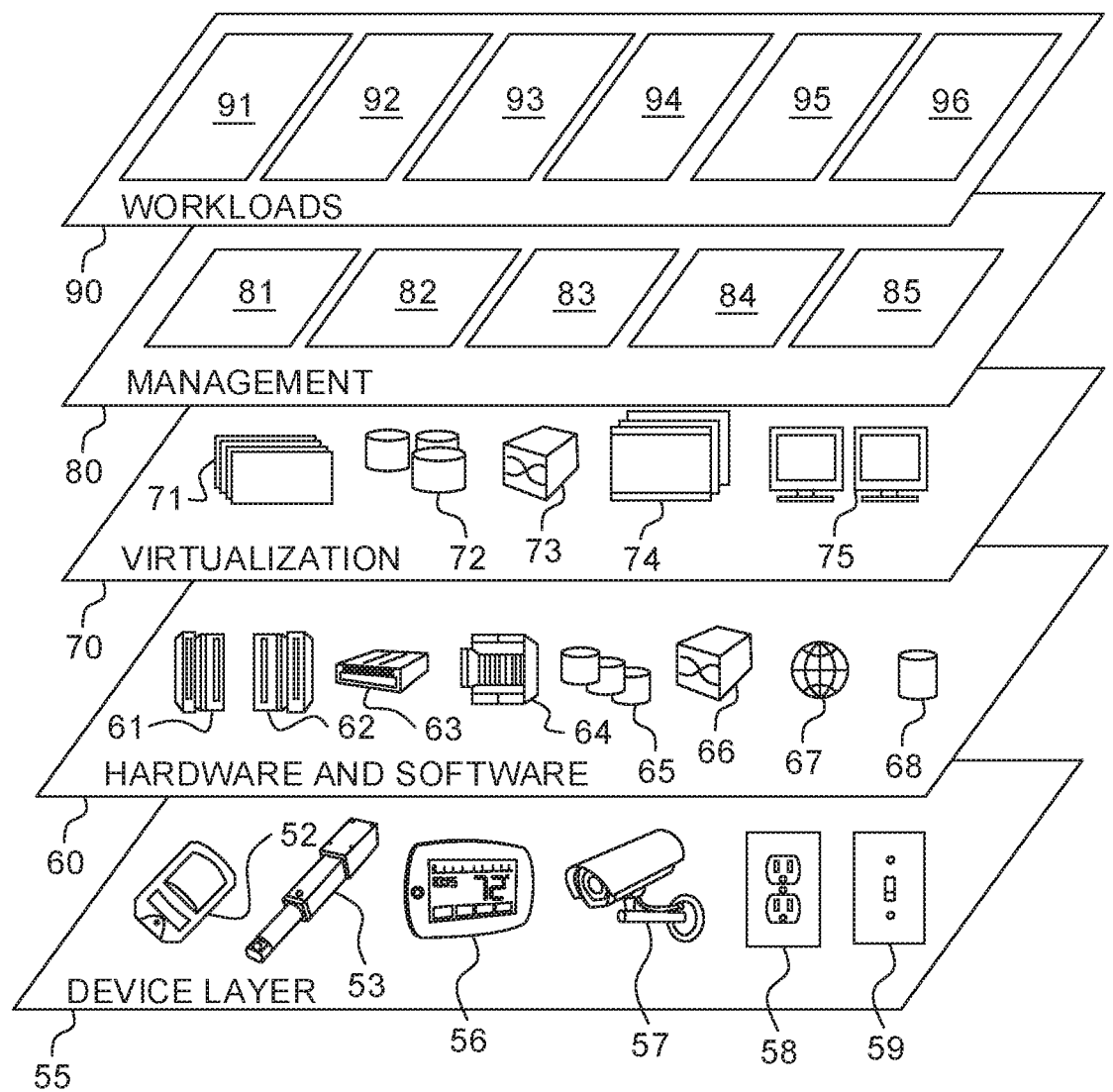
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various automatic feature learning for predictive modelling workloads and functions 96. In addition, automatic feature learning for predictive modelling workloads and functions 96 may include such operations as data analytics, data analysis, and as will be further described, notification functionality. One of ordinary skill in the art will appreciate that the automatic feature learning for predictive modelling workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
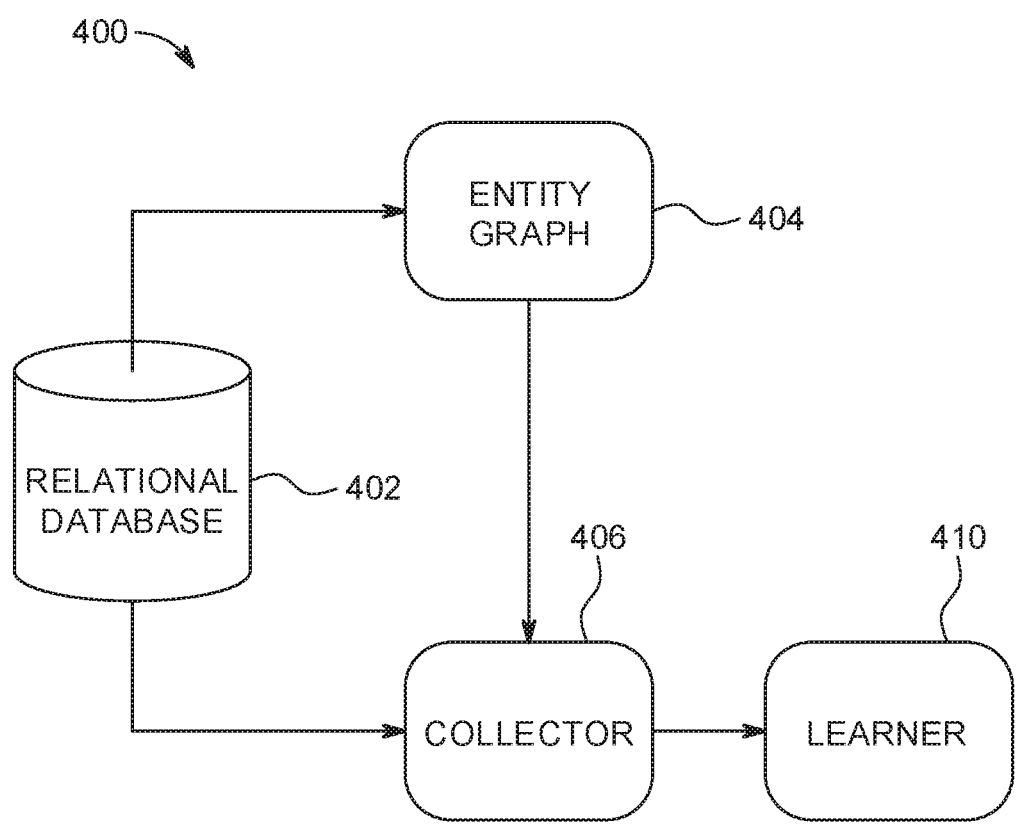
FIG. 4 illustrates a block diagram of an example, non-limiting flow graph representing a feature learning system according to an embodiment of the present invention.

Turning now to FIG. 4, illustrated is a block diagram of an example, non-limiting flow graph 400 representing an automatic feature extraction system in accordance with one or more embodiments described herein.

The system can receive as an input a relational database 402. A relational database can include a set of tables containing data fitted into predefined categories. Each table (which can be referred to as a "relation") can contain one or more data categories in columns. Each row can contain a unique instance of data for the categories defined by the columns. For example, a typical business order entry database would include a table that described a customer with columns for name, address, phone number, and so forth. Another table would describe an order: product, customer, date, sales price, and so forth. Predictive modelling can make predictions about one or more events using the data in the relational database, but correctly understanding and interpreting relationships between the data is important.

For instance, in one embodiment, relational database 402 can include tables showing consumers' profile information including income, age, location and education as well as tables showing banking transactions, transaction amounts, types of purchased products, location of shops, etc. In order to make predictions using the data in the relational database, a predictive model uses features as input for the predictive model. In the example described here, features can include elements of the data that are relevant to the desired prediction. For instance, if the predictive model was designed to predict a likelihood of a consumer applying for a credit card, determining which data is most relevant will assist in improving the accuracy of the prediction.

The system can generate an entity graph 404 from the relational database where the entity graph 404 comprises a first node associated with a first table in the relational database and a second node associated with a second table in the relational database. In an embodiment, the relational database can be first cleaned by the system. Cleaning the data can involve standardizing a format of data in the relational database and filling in missing values while also removing broken data. In an embodiment, sensitive data that may identify individual entities can be anonymized. In other embodiments, the data can be sampled in order to reduce the file size.

Once the data is cleaned, the system can generate the entity graph 404 using the existing table relationship in the database. The entity graph 404 can be extracted from the relational database schema and represent the tables as nodes and relationships between the tables as edges between the nodes. Each node can carry a table in the relational database 402, except the root node of the entity graph 404 carries a main table where each entry of the table corresponds to one entity which is a subject of the predictive analytics problem. In an embodiment therefore, the system can receive information identifying what the target variable is before generating the entity graph 404.

A collector 406 can traverse the entity graph 404 starting at the root node or main table and traverse the entity graph to a predetermined depth. In an embodiment, the predetermined depth can be specified in input received by the system. In other embodiments, the depth can be based on processing efficiency, or as a function of the processing resources required to traverse the entity graph 404 and collect data. In an embodiment, the collector 406 can cache intermediate joining tables to save travel time and memory cost. In an embodiment, the collector 406 can also transform paths into a canonical form and check for equivalent paths to avoid redundant path traversal. If the collector 406 can determine that an equivalent path may yield similar or redundant information, the collector 406 can retain that information to avoid later traversing the redundant paths in order to save time.

A canonical form is a labeled graph Canon(G) that is isomorphic to G, such that every graph that is isomorphic to G has the same canonical form as G. Thus, from a solution to the graph canonization problem, one could also solve the problem of graph isomorphism: to test whether two graphs G and H are isomorphic, compute their canonical forms Canon(G) and Canon(H), and test whether these two canonical forms are identical. In this way, by canonizing the paths, the collector 406 can identify the redundant paths.

A learner 410 can learn features from the collected data by determining a type of data collected, selecting an appropriate data mining algorithm based on the determined type of data, and extracting features from the columns of data using the selected data mining algorithm. The learner 410 may define one or more neural network operations as one or more relational neural network operations and an embedded neural network operation in an embedded layer associated with the resulting joined table. The learner 410 may input numerical data of the resulting joined table into the one or more relational neural network operations that transform the numerical data to one or more features to predict the target variable. The learner 410 may input unstructured data of the resulting joined table into an embedded layer associated with the resulting joined table to transform the unstructured data into numerical data using an embedded neural network operation in the embedded layer.

Figure 5:
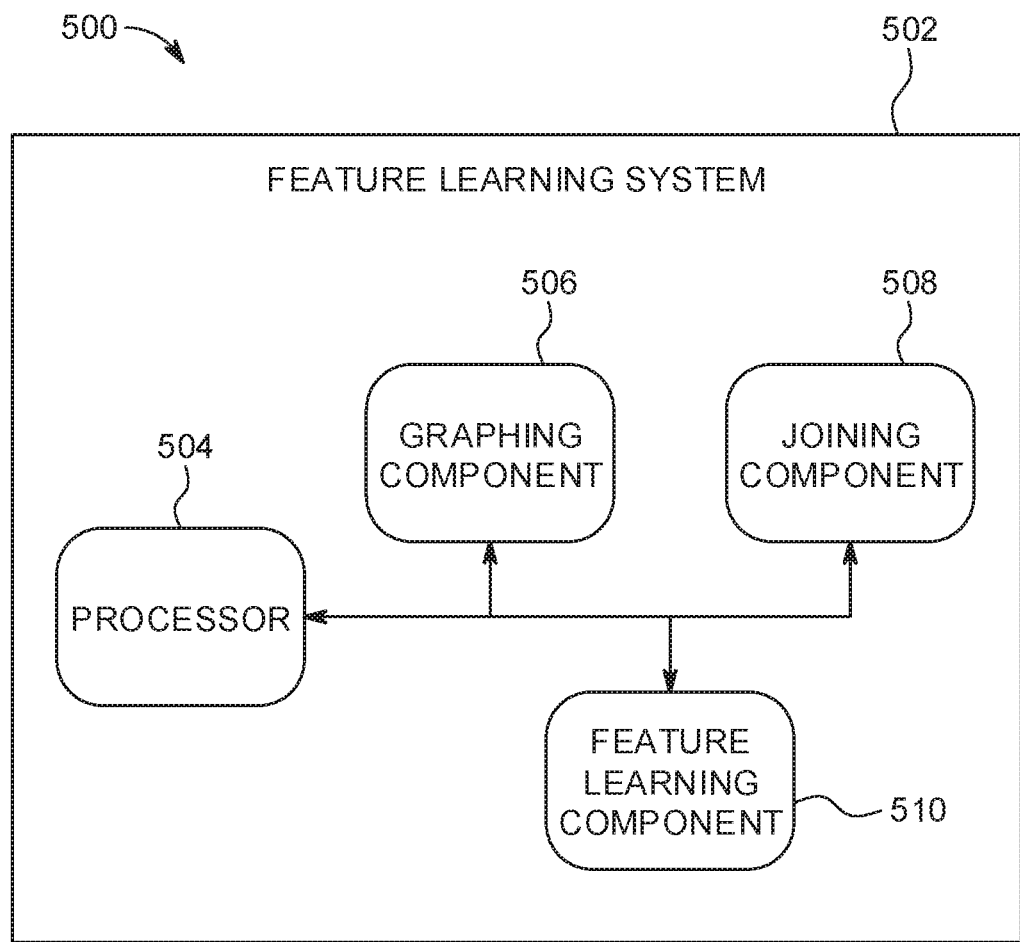
FIG. 5 illustrates another block diagram of an example, non-limiting feature learning system according to an embodiment of the present invention.

Turning now to FIG. 5, illustrated is another block diagram 500 of an example, non-limiting feature learning system 502 that is in accordance with one or more embodiments described herein. Repetitive description of like elements employed in other embodiments described herein is omitted for sake of brevity.

In FIG. 5, the feature learning system 502 can include a processor 504, a graphing component 506, a joining component 508, and a feature learning component 510.

In one example, the feature learning system 502 can be a neural network (e.g., an artificial neural network, a machine learning neural network, etc.) associated with interconnected semantic labeling that provides an estimated functional model from a set of unknown inputs. In another example, the feature learning system 502 can be associated with a Bayesian network that provides a graphical model that represents relationships between a set of variables (e.g., a set of random variables). In yet another example, the feature learning system 502 can be associated with a hidden Markov model that models data over a continuous time interval and/or outputs a probability distribution. However, the feature learning system 502 can alternatively be associated with a different machine learning system such as, but not limited to, a clustering machine learning system, a decision tree machine learning system, an instance-based machine learning system, a regression machine learning system, a regularization machine learning system, a rule learning machine learning system, etc. Furthermore, it is to be appreciated that the feature learning system 502 can be any number of different types of machine learning systems to facilitate a semantic labeling process associated with a network of interconnected processing components.

The feature learning system 502 and/or the components of the feature learning system 502 can be employed to use hardware and/or software to solve problems that are highly technical in nature (e.g., related to bioinformatics, authentication, compression, big data analysis, etc.), that are not abstract, and that cannot be performed as a set of mental acts by a human. Further, some of the processes performed may be performed by specialized computers for carrying out defined tasks related to the semantic labeling application/subject area. The feature learning system 502 and/or components of the system can be employed to solve new problems that arise through advancements in technology, computer networks, the Internet and the like. The feature learning system 502 can provide technical improvements to feature learning and feature engineering by improving processing efficiency among processing components in a feature learning system, reducing delay in processing performed by processing components in a feature learning system, avoiding or reducing the likelihood of network bottlenecks between processing components in a feature learning system and predictive analytics operation, and/or improving bandwidth utilization for a network of processing components in a feature extraction system, etc.

A processor 504 can be associated with at least one processor (e.g., a central processing unit, a graphical processing unit, etc.). In various embodiments, the processor 504 can be or include hardware, software (e.g., a set of threads, a set of processes, software in execution, etc.) or a combination of hardware and software that performs a computing task for machine learning (e.g., a machine learning computing task associated with received data). For example, the processor 504 can execute data analysis threads that cannot be performed by a human (e.g., are greater than the capability of a single human mind). For example, the amount of data processed, the speed of processing of the data and/or the data types processed by processor 504 over a certain period of time can be respectively greater, faster and different than the amount, speed and data type that can be processed by a single human mind over the same period of time. For example, data processed by processor 504 can be raw data (e.g., raw audio data, raw video data, raw textual data, raw numerical data, etc.) and/or compressed data (e.g., compressed audio data, compressed video data, compressed textual data, compressed numerical data, etc.) captured by one or more sensors and/or one or more computing devices. Moreover, processor 504 can be fully operational towards performing one or more other functions (e.g., fully powered on, fully executed, etc.) while also processing the above-referenced data analysis data and runtime environment data.

In an embodiment, the graphing component 506 can generate a graph (e.g., entity graph 404) based on a relational database (e.g., relational database 402), wherein the graph has a set of nodes that correspond to respective tables in the relational database. In another embodiment, the joining component 508 can join the respective tables to form a joined table based on an edge connecting nodes of the set of nodes, wherein the joined table is joined by a column of data that is shared by the respective tables. In another embodiment, the feature learning component 510 can learn features from the collected data. The feature learning component 510 may also transform the resulting joined table to one or more features to predict a target variable. The feature learning component 510 may also define one or more neural network operations as one or more relational neural network operations and an embedded neural network operation in an embedded layer associated with the resulting joined table.

In one aspect, the feature learning component 510 may input numerical data of the resulting joined table into the one or more relational neural network operations that transform the numerical data to one or more features to predict the target variable. In an additional embodiment, the feature learning component 510 may input unstructured data of the resulting joined table into the embedded layer associated with the resulting joined table. The unstructured data may be from a group consisting of spatial-temporal data, time-series data, sequence data, item set data, number set data, singleton data, text data and image data. The feature learning component 510 may transform the unstructured data into numerical data using the embedded neural network operation in the embedded layer associated. The feature learning component 510 may also transform the numerical data by the embedded neural network operation into the one or more relational neural networks.

In an embodiment, the graphing component 506 receives as an input, a relational database that has been selected and cleaned by a cleaning algorithm. The cleaning algorithm can repair and or remove broken and missing data, as well as standardize the format of the data in the relational database. In one or more embodiments, the cleaning algorithm can also sample the dataset, taking random or pseudo-random samples in order to reduce the file size of the dataset. In other embodiments, the cleaning algorithm can anonymize the data by removing identifying and/or other sensitive information.

In an embodiment, the graphing component 506 can build an entity graph from the tables in the relational database by incrementally joining the tables at related columns. For instance, if a first table has a set of columns, and a second table has a second set of columns, and a column in the first set of columns is related to another column in the second set of columns, the graphing component 506 can represent the tables as nodes, and connect the nodes along an edge, the edge representing the relationship between the two tables. In an embodiment, each node in the entity graph carries or represents a table in the relational database, and there can be a root node, which corresponds to a main table where each of the entries of the main table can correspond to an entity which is a subject of the predictive analytics problem. In an embodiment, the graphing component 506 can receive input indicating what the target variable is, and select the root node based on the desired target variable.

In an embodiment, the joining component 508 can then merge the tables at the related columns. The joining component 508 can determine which tables and columns are related based on the edge between the nodes in the entity graph generated by the graphing component 506 and generate a column of data that is merged from a column in the first table and a column in the second table.

In an embodiment, the feature learning component 510 can automatically learn features from the joined column of data by using the joined column of data as an input into one or more neural network operations that transform the joined column of data to one or more features to predict a target variable. The data in the column of data can be selected from a group consisting of spatial-temporal data, time-series data, sequence data, item set data, number set data, singleton data, text and image data, etc. The output of the learned features can be fed into one or more predictive models. The feature learning component 510 can also select which of the learned features to submit to the prediction model based on a statistical relevance to the target variable.

Figure 6:
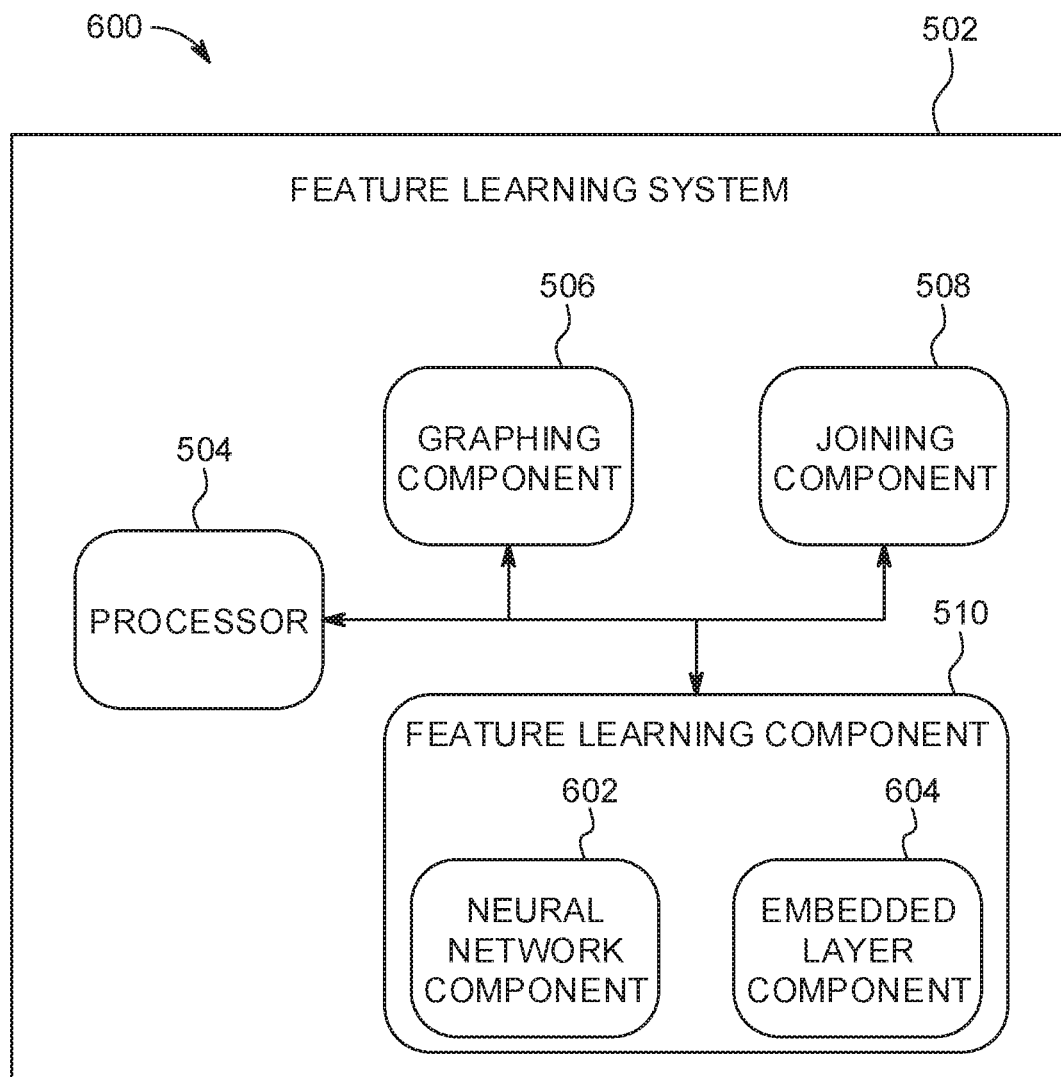
FIG. 6 illustrates another block diagram of an example, non-limiting feature learning system according to an embodiment of the present invention.

Turning now to FIG. 6, illustrated is another block diagram 600 of an example, non-limiting feature learning system 502 (as described in FIG. 5) that identifies a type of data and selects an appropriate data mining technique in accordance with one or more embodiments described herein. Repetitive description of like elements employed in other embodiments described herein is omitted for sake of brevity.

In FIG. 6, the feature learning component 510 can include a neural network component 602 and an embedded layer component 604. In an embodiment, the neural network component 602 can learn one or more features in the joined column of data, and the embedded layer component 604 can select a network structure to learn and embed unstructured data to numerical vectors based on whether the data is from a group consisting of spatial-temporal data, time-series data, sequence data, item set data, number set data, singleton data, text data and image data. The feature learning component 510 may define one or more neural network operations as one or more relational neural network operations and an embedded neural network operation in an embedded layer associated with the resulting joined table.

In one aspect, the neural network component 602 may input numerical data of the resulting joined table into the one or more relational neural network operations that transform the numerical data to one or more features to predict the target variable. In an additional embodiment, the embedded layer component 604 (which may use an embedded neural network operation) may input unstructured data of the resulting joined table into an embedded layer associated with the resulting joined table.

As an example, if the feature learning component 510 determines that the column of data contains time series data, the neural network component 602 can transform series into a compact representation using the relational recurrent neural net.

As another example, if the feature learning component 510 determines that the column of data contains symbolic sequence data, the neural network component 602 can transform the symbolic sequences into a fixed-size numerical vector using the relational recurrent neural net.

As another example, if the feature learning component 510 determines that the column of data contains item set data, the neural network component 602 can transform item set into a compact representation using the relational recurrent neural net.

As another example, if the feature learning component 510 determines that the column of data contains singleton data and is a categorical value, the embedded layer component 604 can transform the column of data into numerical features using a dictionary based embedding method.

As another example, if the feature learning component 510 determines that the column of data contains text data, the embedded layer component 604 can treat the text as symbolic sequence data.

As another example, if the feature learning component 510 determines that the column of data contains image data, the embedded layer component 604 can select a neural network structure such as convolution net to transform the image into a fixed size representation vector.

As another example, if the feature learning component 510 determines that the column of data contains spatial-temporal data, the embedded layer component 604 can transform data into a compact numerical vector representation using the recurrent neural net.

Figure 7:
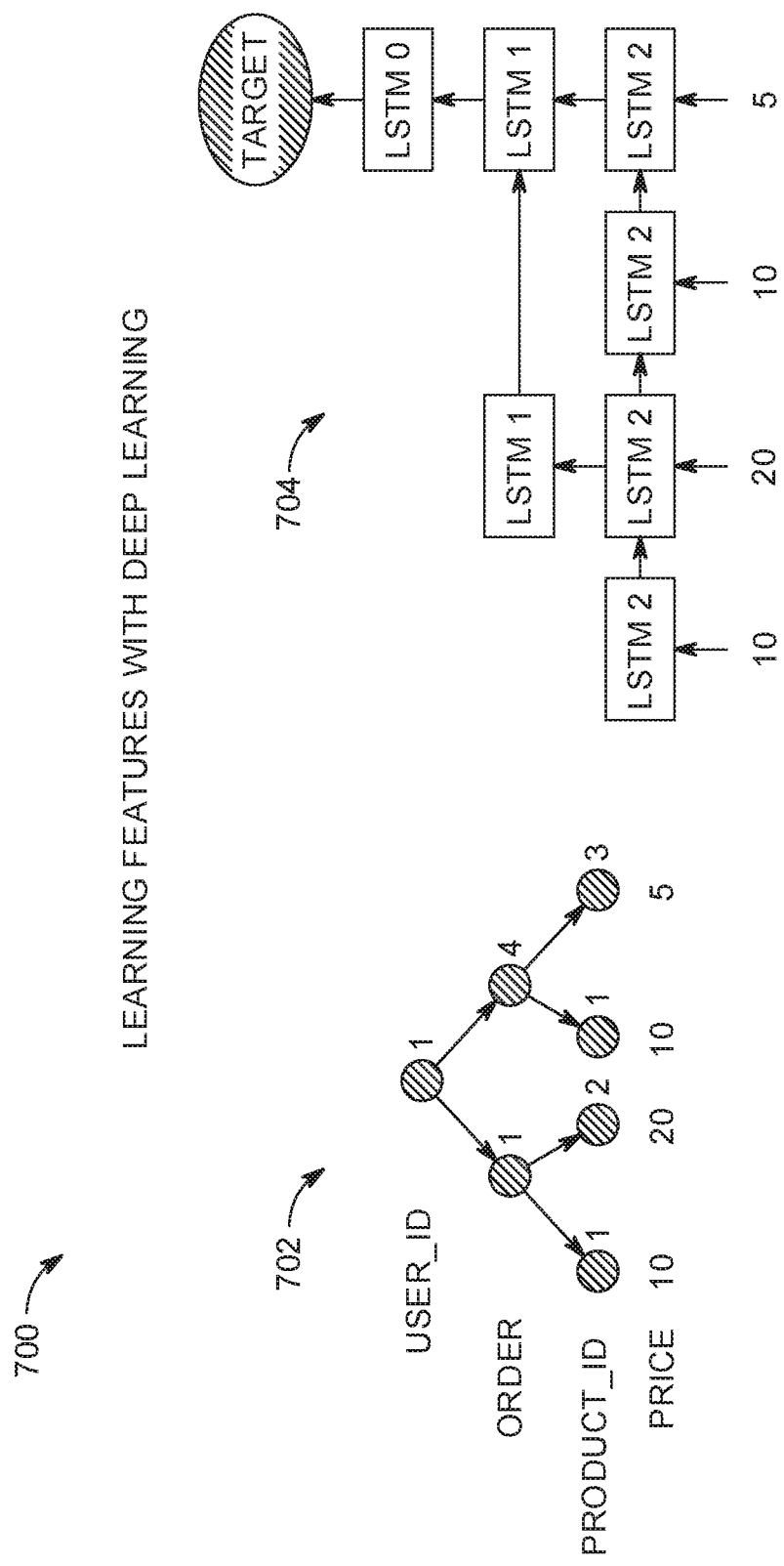
FIG. 7 is an additional block diagram depicting exemplary automatic feature learning using a neural network for predictive modelling according to an embodiment of the present invention.

FIG. 7 is a block diagram depicting exemplary automatic feature learning system 700 using a neural network for predictive modelling. The automatic feature learning system 700 includes a relational tree 702 having multiple nodes. For example, the entity graph has a parent node (e.g., labeled as "user_id"), two child nodes (e.g., labeled as "order"), and four grandchildren nodes (e.g., labeled as "product_id"), which also show the price at the bottom of the node. In one aspect, the relational tree 702 may be a joined table based on an edge between nodes of the set of nodes. That is, the relational tree 702 (e.g., joined table) is joined by a column of data that is shared by the respective tables. The relational tree 702 may be a hierarchical neural network structure. At every intermediate node of the relational tree 702, one or more recurrent neural networks (RNN) (e.g., long short-term memory "LSTM" RNN architecture) or spiking neural networks (SNN) may be used. As depicted, FIG. 7 illustrates using "LSTM1" or "LSTM2" at every intermediate node, by way of example only, and is not intended to be limiting. A transformation function may take inputs from the node's children and produce an output vector. If the children nodes are ordered, an RNN may be used as a transformation function, or the SNN may be used.

The one or more RNNs may be used to transform the data under one or more nodes in the relational tree 702. Feature learning may be automatically performed (which may be supervised) to predict a target variable 704. In one aspect, the nodes having the same depth may have shared weights.

In operation, data of the relational tree 702 may be input into the one or more relational neural network operations (e.g., LSTM1 or LSTM2) that transform the numerical data to one or more features to predict the target variable 704. The data of the relational tree 702 may be input into the one or more RNNs as a sequence of vectors and the output may be a feature vector. In one aspect, each RNN may have at least three sets of parameters: input-hidden, hidden-hidden and hidden-output connection. The number of layers may be equal to the length of the sequence so that the RNN may be a dynamic neural network structure. The RNN of FIG. 7 may include the LSTM and gated recurrent units (GRU).

Figure 8:
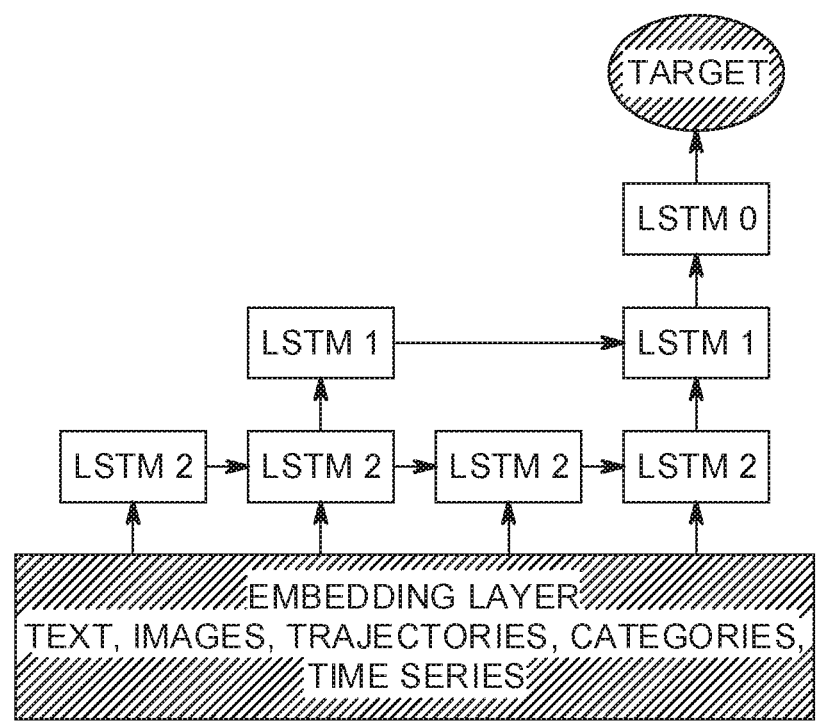
FIG. 8 is an additional block diagram depicting exemplary automatic feature learning using a neural network and an embedded layer for predictive modelling according to an embodiment of the present invention.

Turning now to FIG. 8, automatic feature learning using a neural network and an embedded layer for predictive modelling of the automatic feature learning system 700 of FIG. 7 is depicted. The relational tree 702 of FIG. 7 may be associated with an embedded layer. The embedding layer may input unstructured data (e.g., text, images, trajectories, categories, time-series, and the like) of the resulting joined table into the embedded layer associated with the relational tree 702 of FIG. 7 (e.g., a resulting joined table). In one aspect, the unstructured data is from a group consisting of spatial-temporal data, time-series data, sequence data, item set data, number set data, singleton data, text data and image data. An embedded neural network operation may transform the unstructured data into numerical data in the embedded layer associated. The numerical data may be transformed by the embedded neural network operation into the one or more relational neural network operations (e.g., LSTM 1 or LSTM 2) that transform the numerical data to one or more features to predict the target variable.

Figure 9:
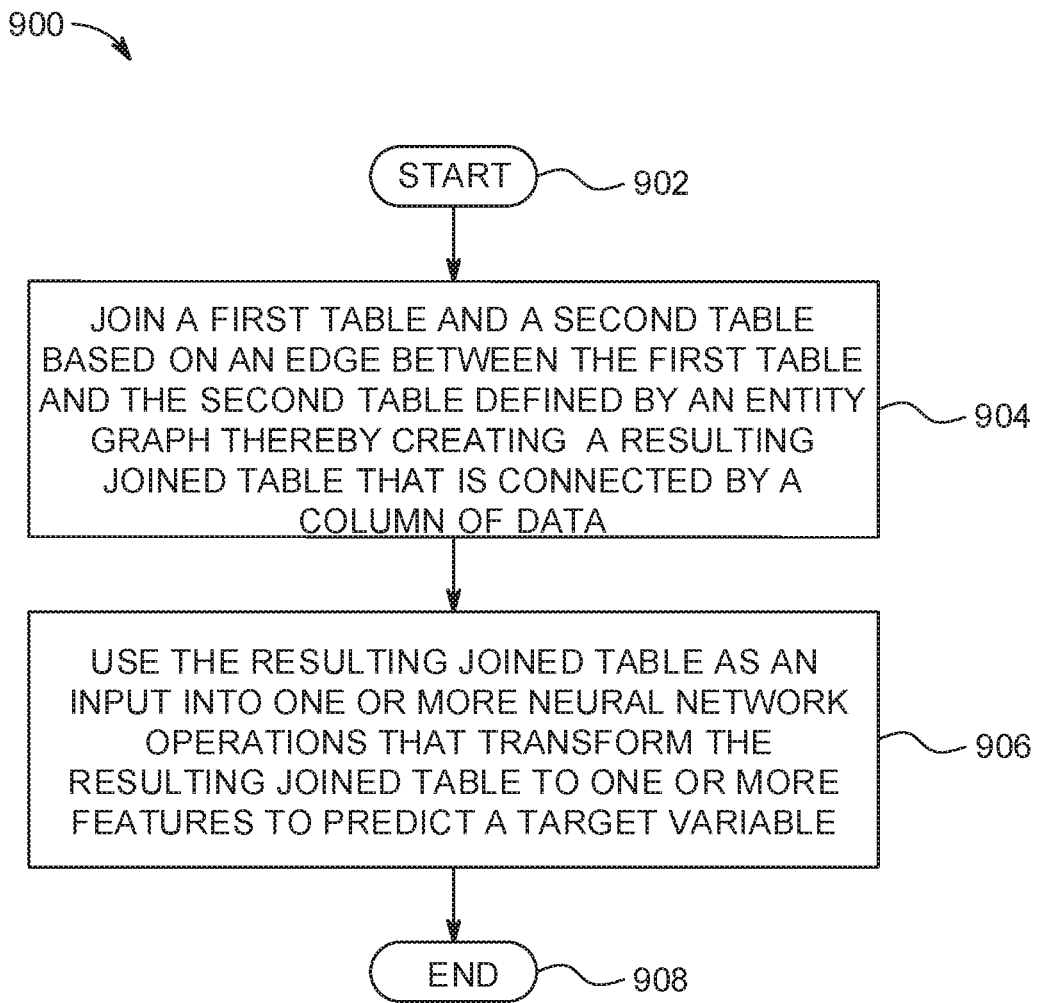
FIG. 9 is a flowchart diagram depicting an exemplary method for automatic feature learning for predictive modelling in a computing environment by a processor, again in which aspects of the present invention may be realized.

FIG. 9 is a flowchart diagram depicting an exemplary method for automatic feature learning for predictive modelling in a computing environment. In one aspect, each of the devices, components, modules, operations, and/or functions described in FIGS. 1-8 also may apply or perform one or more operations or actions of FIG. 9. The functionality 900 may be implemented as a method executed as instructions on a machine, where the instructions are included on at least one computer readable medium or one non-transitory machine-readable storage medium. The functionality 900 may start in block 902. A first table and a second table are joined based on an edge between the first table and the second table defined by an entity graph thereby creating a resulting joined table that is connected by a column of data, as in block 904. The resulting joined table may be used as an input into one or more neural network operations that transform the resulting joined table to one or more features to predict a target variable, as in block 906. The functionality 900 may end, as in block 908.

In one aspect, in conjunction with and/or as part of at least one block of FIG. 9, the operations of method 900 may include each of the following. The operations of method 900 may define the one or more neural network operations as one or more relational neural network operations and an embedded neural network operation in an embedded layer associated with the resulting joined table. The operations of method 900 may input numerical data of the resulting joined table into the one or more relational neural network operations that transform the numerical data to one or more features to predict the target variable.

In an additional aspect, the operations of method 900 may input unstructured data of the resulting joined table into the embedded layer associated with the resulting joined table, wherein unstructured data is from a group consisting of spatial-temporal data, time-series data, sequence data, item set data, number set data, singleton data, text data and image data, transform the unstructured data into numerical data using the embedded neural network operation in the embedded layer associated, and input the numerical data transformed by the embedded neural network operation into the one or more relational neural network operations that transform the numerical data to one or more features to predict the target variable.

Numerical data may be input, according to a hierarchical order of the resulting joined table, into the one or more relational neural network operations that transform the numerical data to one or more features to predict the target variable.

The operations of method 900 may collect features extracted from the first table and the second table by traversing the entity graph. The operations of method 900 may include generating the entity graph based on a relational database, wherein the entity graph comprises a first node associated with a first table in the relational database and a second node associated with a second table in the relational database. The entity graph may be traversed to a depth based on a defined criterion.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for automatic feature learning for predictive modelling in a computing environment, comprising:
    joining a first table and a second table based on an edge between the first table and the second table defined by an entity graph, wherein a resulting joined table is connected by a column of data;
    using the resulting joined table as an input into one or more neural network operations that transform the resulting joined table to one or more features to predict a target variable;
    defining the one or more neural network operations as one or more relational neural network operations and an embedded neural network operation in an embedded layer associated with the resulting joined table; and
    inputting numerical data according to a hierarchical order of the resulting joined table into the one or more relational neural network operations that transform the numerical data to one or more features to predict the target variable.

2. The method of claim 1, further including inputting the numerical data of the resulting joined table into the one or more relational neural network operations that transform the numerical data to one or more features to predict the target variable.

3. The method of claim 1, further including:
    inputting unstructured data of the resulting joined table into the embedded layer associated with the resulting joined table, wherein unstructured data is from a group consisting of spatial-temporal data, time-series data, sequence data, item set data, number set data, singleton data, text data and image data;
    transforming the unstructured data into the numerical data using the embedded neural network operation in the embedded layer associated; and
    inputting the numerical data transformed by the embedded neural network operation into the one or more relational neural network operations that transform the numerical data to one or more features to predict the target variable.

4. The method of claim 1, further comprising collecting, by the device, features extracted from the first table and the second table by traversing the entity graph.

5. The method of claim 4, wherein the entity graph is traversed to a depth based on a defined criterion.

6. A system for automatic feature learning for predictive modelling in a computing environment, comprising:
    one or more computers having a physical processor and memory, the memory storing executable instructions that when executed cause the system to:
        join a first table and a second table based on an edge between the first table and the second table defined by an entity graph, wherein a resulting joined table is connected by a column of data;
        use the resulting joined table as an input into one or more neural network operations that transform the resulting joined table to one or more features to predict a target variable;

define the one or more neural network operations as one or more relational neural network operations and an embedded neural network operation in an embedded layer associated with the resulting joined table; and input numerical data according to a hierarchical order of the resulting joined table into the one or more relational neural network operations that transform the numerical data to one or more features to predict the target variable.

7. The system of claim 6, wherein the executable instructions that when executed cause the system to input the numerical data of the resulting joined table into the one or more relational neural network operations that transform the numerical data to one or more features to predict the target variable.

8. The system of claim 6, wherein the executable instructions that when executed cause the system to:
input unstructured data of the resulting joined table into the embedded layer associated with the resulting joined table, wherein unstructured data is from a group consisting of spatial-temporal data, time-series data, sequence data, item set data, number set data, singleton data, text data and image data;
transform the unstructured data into the numerical data using the embedded neural network operation in the embedded layer associated; and
input the numerical data transformed by the embedded neural network operation into the one or more relational neural network operations that transform the numerical data to one or more features to predict the target variable.

9. The system of claim 6, wherein the executable instructions that when executed cause the system to collect features extracted from the first table and the second table by traversing the entity graph.

10. The system of claim 9, wherein the entity graph is traversed to a depth based on a defined criterion.

11. A computer program product for, by a processor, automatic feature learning for predictive modelling in a computing environment, the computer program product comprising a non-transitory computer-readable storage medium having computer-readable program code portions stored therein, the computer-readable program code portions comprising:

an executable portion that joins a first table and a second table based on an edge between the first table and the second table defined by an entity graph, wherein a resulting joined table is connected by a column of data;
an executable portion that uses the resulting joined table as an input into one or more neural network operations that transform the resulting joined table to one or more features to predict a target variable;
an executable portion that defines the one or more neural network operations as one or more relational neural network operations and an embedded neural network operation in an embedded layer associated with the resulting joined table; and
an executable portion that inputs numerical data according to a hierarchical order of the resulting joined table into the one or more relational neural network operations that transform the numerical data to one or more features to predict the target variable.

12. The computer program product of claim 11, further including an executable portion that inputs the numerical data of the resulting joined table into the one or more relational neural network operations that transform the numerical data to one or more features to predict the target variable.

13. The computer program product of claim 11, further including an executable portion that:
inputs unstructured data of the resulting joined table into the embedded layer associated with the resulting joined table, wherein unstructured data is from a group consisting of spatial-temporal data, time-series data, sequence data, item set data, number set data, singleton data, text data and image data;
transforms the unstructured data into the numerical data using the embedded neural network operation in the embedded layer associated; and
inputs the numerical data transformed by the embedded neural network operation into the one or more relational neural network operations that transform the numerical data to one or more features to predict the target variable.

14. The computer program product of claim 11, further including an executable portion that collects features extracted from the first table and the second table by traversing the entity graph, wherein the entity graph is traversed to a depth based on a defined criterion.

* * * * *